(12) United States Patent
Auwens et al.

(10) Patent No.: US 6,377,518 B1
(45) Date of Patent: Apr. 23, 2002

(54) METHOD AND DEVICE FOR RECORDING REAL-TIME INFORMATION

(75) Inventors: Johannes C. L. Auwens, Oss; Robert A. Brondijk, Eindhoven, both of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/439,198

(22) Filed: Nov. 12, 1999

(30) Foreign Application Priority Data

Nov. 16, 1998 (EP) ............................................. 98203858

(51) Int. Cl.⁷ ............................................... G11B 17/22
(52) U.S. Cl. ................................. 369/30.04; 369/47.15
(58) Field of Search ................................. 369/32, 275.3, 369/275.2, 59.1, 59.25, 59.26, 59.27; 386/97, 98, 125, 126

(56) References Cited

U.S. PATENT DOCUMENTS 5,703,997 A * 12/1997 Kitamura et al. ............. 386/97
6,034,942 A * 3/2000 Yoshio et al. ............ 369/275.3
6,094,521 A * 7/2000 Okayama et al. ............. 386/44
6,188,650 B1 * 2/2001 Hamada et al. ................ 369/33

FOREIGN PATENT DOCUMENTS

EP 0814475 A1 12/1997
EP 0942426 A2 9/1999

* cited by examiner

*Primary Examiner*—Tan Dinh
(74) *Attorney, Agent, or Firm*—Michael E. Belk

(57) ABSTRACT

Video information is arranged according to a recording format, e.g. DVD-video, for being playable in standardized players. The video information is subdivided into cells and playback parameters for reproducing sequences of the cells are included in control information. The format prescribes that within the recording area the control information precedes the video information for playback functions of the recorded video. However for home recording it is preferable that a recording is made in one pass, i.e. the video is to be recorded directly at its final location. Therefore the recorder has a control unit for performing the following steps: first creating a free area by selecting a starting point within the recording area different from the beginning of the recording area, thereafter recording the real-time information from the starting point, and recording the control information in said free area.

14 Claims, 18 Drawing Sheets

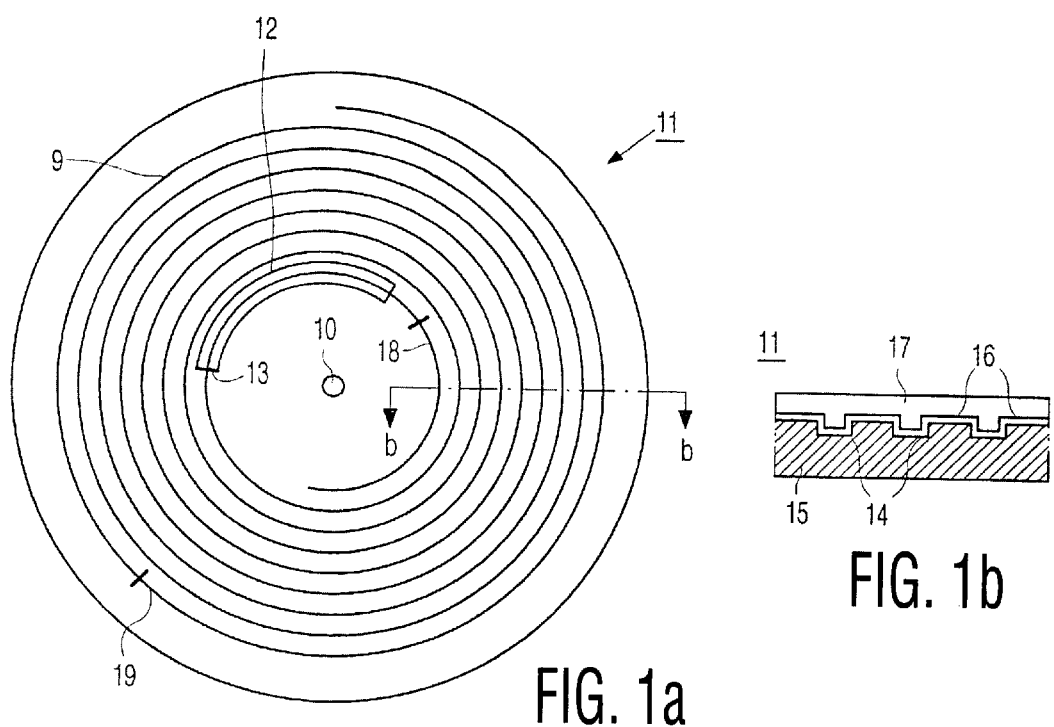
FIG. 1a
FIG. 1b
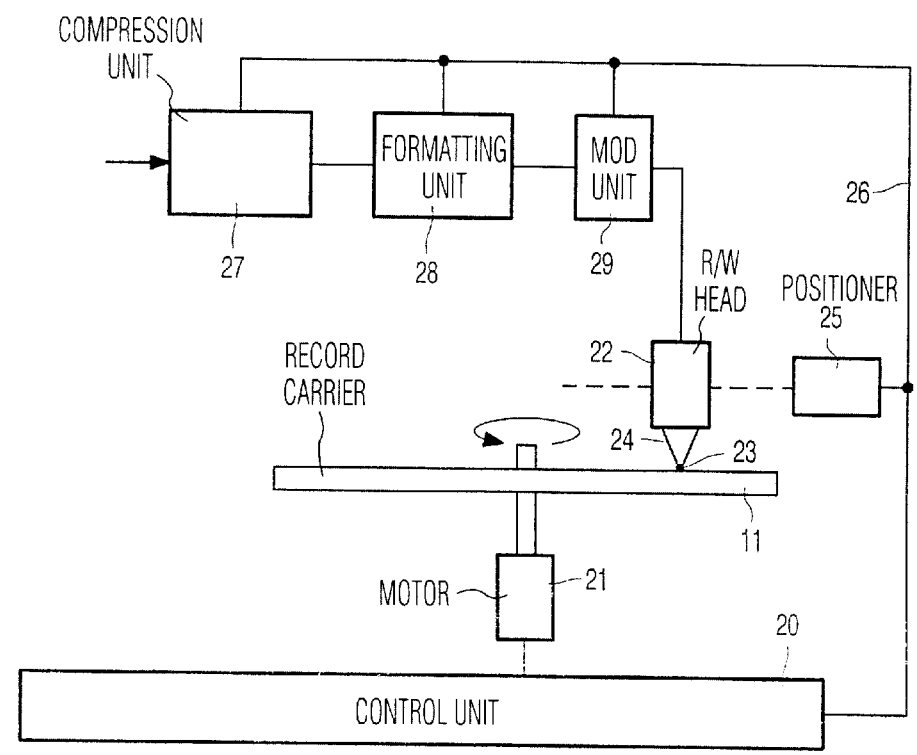
FIG. 2

VIDEO TITLE SET (VTS)

| |
|---|
| VIDEO TITLE SET INFORMATION (VTSI) (Mandatory) |
| VIDEO OBJECT SET FOR VIDEO TITLE SET MENU (VTSM_VOBS) (Optional) |
| VIDEO OBJECT SET FOR VIDEO TITLE SET MENU (VTSTT_VOBS) (Mandatory) |
| BACKUP FOR VIDEO TITLE SET INFORMATION (VTSI_BUP) (Mandatory) |

| |
|---|
| VIDEO TITLE SET INFORMATION MANAGEMENT TABLE (VTSI_MAT) (Mandatory) |
| VIDEO TITLE SET PART OF TITLE SEARCH POINTER TABLE (VTS_PTT_SRPT) (Mandatory) |
| VIDEO TITLE SET PROGRAM CHAIN INFORMATION TABLE (VTS_PGCIT) (Mandatory) |
| VIDEO TITLE SET MENU PACI UNIT TABLE (VTSM_PGCI_UT) (Mandatory) |
| VIDEO TITLE SET TIME MAP TABLE (VTS_TMAPT) (Optional) |
| VIDEO TITLE SET MENU CELL ADDRESS TABLE (VTSM_C_ADT) (Mandatory) |
| VIDEO TITLE SET MENU VIDEO OBJECT ADDRESS MAP (VTSM_VOBU_ADMAP) (Mandatory when VTSM_VOBS exists) |
| VIDEO TITLE SET CELL ADDRESS TABLE (VTS_C_ADT) (Mandatory when VTSM_VOBS exists) |
| VIDEO TITLE SET VIDEO OBJECT UNIT ADDRESS MAP (VTS_VOBU_ADMAP) (Mandatory) |

FIG. 8

PROGRAM CHAIN INFORMATION (PGCI)

| |
|---|
| PROGRAM CHAIN GENERAL INFORMATION (PGC_GI) |
| PROGRAM CHAIN COMMAND TABLE (PGC_CMDT) |
| PROGRAM CHAIN PROGRAM MAP (PGC_PGMP) |
| CELL PLAYBACK INFORMATION TABLE (C_PBIT) |
| CELL POSITION INFORMATION TABLE (C_POSIT) |

FIG. 10

| DSI_GI (DSI GENERAL INFORMATION) | |
|---|---|
| NV_PCK_SCR | SCR_BASE OF NV_PCK |
| NV_PCK_LBN | LBN OF NV_PCK |
| VOBU_EA | END ADDRESS OF VOBU |
| VOBU_1STREF_EA | END ADDRESS OF THE FIRST REFERENCE PICTURE IN VOBU |
| VOBU_2NDREF_EA | END ADDRESS OF THE SECOND REFERENCE PICTURE IN VOBU |
| VOBU_3RDREF_EA | END ADDRESS OF THE THIRD REFERENCE PICTURE IN VOBU |
| VOBU_VOB_IDN | VOB ID NUMBER OF THE VOBU |
| | RESERVED |
| VOBU_C_IDN | CELL ID NUMBER OF THE VOBU |
| C_ELTM | CELL ELAPSE TIME |

FIG. 15

SML_PBI (SEAMLESS PLAYBACK INFORMATION)

| | |
|---|---|
| VOBU_SML_CAT | CATEGORY OF SEAMLESS VOBU |
| ILVU_EA | END ADDRESS OF INTERLEAVED UNIT |
| NXT_ILVU_SA | START ADDRESS OF THE NEXT INTERLEAVED UNIT |
| NXT_ILVU_SZ | SIZE OF THE NEXT INTERLEAVED UNIT |
| VOB_V_S_PTM | VIDEO START PTM IN VOB |
| VOB_V_E_PTM | VIDEO END PTM IN VOB |
| VOB_A_STP_PTM | AUDIO STOP TIME IN VOB |
| VOB_A_GAP_LEN | AUDIO GAP LENGTH IN VOB |

FIG. 16

| SML_AGLI (SEAMLESS ANGLE INFORMATION) | |
|---|---|
| SML_AGL_C1_DSTA | ADDRESS AND SIZE OF DESTINATION ILVU IN AGL_C1 |
| SML_AGL_C2_DSTA | ADDRESS AND SIZE OF DESTINATION ILVU IN AGL_C2 |
| SML_AGL_C3_DSTA | ADDRESS AND SIZE OF DESTINATION ILVU IN AGL_C3 |
| SML_AGL_C4_DSTA | ADDRESS AND SIZE OF DESTINATION ILVU IN AGL_C4 |
| SML_AGL_C5_DSTA | ADDRESS AND SIZE OF DESTINATION ILVU IN AGL_C5 |
| SML_AGL_C6_DSTA | ADDRESS AND SIZE OF DESTINATION ILVU IN AGL_C6 |
| SML_AGL_C7_DSTA | ADDRESS AND SIZE OF DESTINATION ILVU IN AGL_C7 |
| SML_AGL_C8_DSTA | ADDRESS AND SIZE OF DESTINATION ILVU IN AGL_C8 |
| SML_AGL_C9_DSTA | ADDRESS AND SIZE OF DESTINATION ILVU IN AGL_C9 |

FIG. 17

CONTENTS

| | | |
|---|---|---|
| FWDI | VIDEO | NEXT VOBU START ADDRESS WITH A VIDEO DATA |
| FWDI | 240 | +240 VOBU START ADDRESS AND VIDEO EXIST FLAG |
| FWDI | 140 | +120 VOBU START ADDRESS AND VIDEO EXIST FLAG |
| FWDI | 60 | + 60 VOBU START ADDRESS AND VIDEO EXIST FLAG |
| FWDI | 20 | + 20 VOBU START ADDRESS AND VIDEO EXIST FLAG |
| FWDI | 15 | + 15 VOBU START ADDRESS AND VIDEO EXIST FLAG |
| FWDI | 14 | + 14 VOBU START ADDRESS AND VIDEO EXIST FLAG |
| FWDI | 13 | + 13 VOBU START ADDRESS AND VIDEO EXIST FLAG |
| FWDI | 12 | + 12 VOBU START ADDRESS AND VIDEO EXIST FLAG |
| FWDI | 11 | + 11 VOBU START ADDRESS AND VIDEO EXIST FLAG |
| FWDI | 10 | + 10 VOBU START ADDRESS AND VIDEO EXIST FLAG |
| FWDI | 9 | + 9 VOBU START ADDRESS AND VIDEO EXIST FLAG |
| FWDI | 8 | + 8 VOBU START ADDRESS AND VIDEO EXIST FLAG |
| FWDI | 7 | + 7 VOBU START ADDRESS AND VIDEO EXIST FLAG |
| FWDI | 6 | + 6 VOBU START ADDRESS AND VIDEO EXIST FLAG |
| FWDI | 5 | + 5 VOBU START ADDRESS AND VIDEO EXIST FLAG |
| FWDI | 4 | + 4 VOBU START ADDRESS AND VIDEO EXIST FLAG |
| FWDI | 3 | + 3 VOBU START ADDRESS AND VIDEO EXIST FLAG |
| FWDI | 2 | + 2 VOBU START ADDRESS AND VIDEO EXIST FLAG |
| FWDI | 1 | + 1 VOBU START ADDRESS AND VIDEO EXIST FLAG |
| FWDI | NEXT | NEXT VOBU START ADDRESS AND VIDEO EXIST FLAG |
| FWDI | PREV | PREVIOUS VOBU START ADDRESS AND VIDEO EXIST FLAG |
| BWDI | 1 | − 1 VOBU START ADDRESS AND VIDEO EXIST FLAG |
| BWDI | 2 | − 2 VOBU START ADDRESS AND VIDEO EXIST FLAG |
| BWDI | 3 | − 3 VOBU START ADDRESS AND VIDEO EXIST FLAG |
| BWDI | 4 | − 4 VOBU START ADDRESS AND VIDEO EXIST FLAG |
| BWDI | 5 | − 5 VOBU START ADDRESS AND VIDEO EXIST FLAG |
| BWDI | 6 | − 6 VOBU START ADDRESS AND VIDEO EXIST FLAG |
| BWDI | 7 | − 7 VOBU START ADDRESS AND VIDEO EXIST FLAG |
| BWDI | 8 | − 8 VOBU START ADDRESS AND VIDEO EXIST FLAG |
| BWDI | 9 | − 9 VOBU START ADDRESS AND VIDEO EXIST FLAG |
| BWDI | 10 | − 10 VOBU START ADDRESS AND VIDEO EXIST FLAG |
| BWDI | 11 | − 11 VOBU START ADDRESS AND VIDEO EXIST FLAG |
| BWDI | 12 | − 12 VOBU START ADDRESS AND VIDEO EXIST FLAG |
| BWDI | 13 | − 13 VOBU START ADDRESS AND VIDEO EXIST FLAG |
| BWDI | 14 | − 14 VOBU START ADDRESS AND VIDEO EXIST FLAG |
| BWDI | 15 | − 15 VOBU START ADDRESS AND VIDEO EXIST FLAG |
| BWDI | 20 | − 20 VOBU START ADDRESS AND VIDEO EXIST FLAG |
| BWDI | 60 | − 60 VOBU START ADDRESS AND VIDEO EXIST FLAG |
| BWDI | 120 | −120 VOBU START ADDRESS AND VIDEO EXIST FLAG |
| BWDI | 240 | −240 VOBU START ADDRESS AND VIDEO EXIST FLAG |
| BWDI | VIDEO | PREVIOUS VOBU START ADDRESS WITH A VIDEO DATA |

FIG. 18

METHOD AND DEVICE FOR RECORDING REAL-TIME INFORMATION

FIELD OF THE INVENTION

The invention relates to the field of recording and playback of real-time information.

BACKGROUND OF THE INVENTION

The invention relates to a method of recording real-time information and control information related thereto in a recording area on a record carrier arranged according to a recording format, in which method the real-time information is subdivided into cells and in which playback parameters for reproducing sequences of the cells are included in the control information.

The invention further relates to a device for recording real-time information and control information related thereto in a recording area on a record carrier arranged according to a recording format, the device comprising recording means arranged for subdividing the real-time information into cells and for including playback parameters in the control information for reproducing sequences of the cells.

A method of recording real-time information on a record carrier is known from EP 814475. Real-time information is information having a real-time nature to be reproduced at a prescribed rate, usually audio or video information, or a combination of audio and video. In the known method video information is encoded digitally and subdivided into cells, which are short, but independently reproducible segments of the real-time information, while corresponding audio information may be included in the cells. Control information for accessing and reproducing the real-time material is generated for enabling several playback functions. A user playable program usually called a title, for example a movie, is constituted by a sequence of cells and corresponding control information, in which the sequence is defined by playback parameters. The control information is generated separately after the video material has been gathered and stored temporarily in a memory, e.g. on a video tape. The user may play the movie at standard speed, or he may scan the material in trick play modes, e.g. fast forward or slow motion. The control information may further comprise different sequences built out of the same video material, or further pointers for accessing any moment within the real-time material for jumping to specific scenes. The way the control information and the real-time information are provided on a record carrier is standardized to enable players of different brands to reproduce the material. An example of such a standard is the DVD-video standard, of which the relevant aspects, such as control information, are described in said EP 814475. The real-time information and control information are finally transferred to the record carrier by well known mastering and reproducing steps, e.g. pressing optical discs from a metal master disc. A problem of the known recording method is, that a temporary storage of the real-time information is required before the control information can be generated. On the final product, the record carrier, the control information is to be positioned according to the format rules, which prescribe that the control information precedes the real-time information. However the control information is generated after all real-time material is known and stored temporarily. Hence the known method of recording is complicated and expensive, in particular in view of home recording.

The above citations are hereby incorporated in whole by reference.

SUMMARY OF THE INVENTION

It is an object of the invention to provide a recording method and device in which real-time information can be recorded according to an existing format and which is less complex.

For this purpose, the method as described in the opening paragraph is characterized in that the method comprises the steps of first selecting a starting point within the recording area different from the beginning of the recording area for creating a free area between the beginning of the recording area and the starting point, thereafter recording the real-time information from the starting point, and recording the control information in said free area. The device as described in the opening paragraph is characterized in that the recording means are arranged for first selecting a starting point within the recording area different from the beginning of the recording area for creating a free area between the beginning of the recording area and the starting point, thereafter recording the real-time information from the starting point, and recording the control information in said free area. Creating the free area has the effect, that a real-time recording can be made in one pass, i.e. the real-time information is recorded on a record carrier of a writable type directly at its final location without temporary storage, while the control information is generated during recording. The control information may be stored temporarily in a memory, e.g. in a buffer IC. It is to be noted, that the amount of digital data for the control information is substantially smaller than the amount of data for the real-time information, usually less than 1%. Hence a memory for temporary storage is inexpensive, and the recording device is suitable for home recording.

The invention is also based on the following recognition. Formats intended for mastered and mass produced record carriers of a read-only type usually prescribe a non-causal order in which the control information precedes the recorded audio/video, because this is the order playback devices require the information for reproduction. Non-causality inherently arises during recording, because one cannot calculate sequences and pointers for video material not yet available, in particular if the video is compressed to a variable length digital code such as MPEG2. For a professional recording studio this presents no problem, as the audio/video material is always stored temporarily, e.g. on a master video tape, before the final authoring process, in which the control data is calculated, is performed. In a home recorder one-pass recording is required, and therefore the DVD-video format seems unsuitable. However the inventors have seen, that the prescribed non causal ordering can be achieved by reserving space at the beginning of the record carrier and generating a basic set of control information and playback parameters during the recording of the real-time information itself. The generated control information is stored in a temporary memory, and written to the reserved area as soon as possible, e.g. directly when a stop recording command is received or even during real-time recording when buffering is available for the real-time recording process. Although a few parameters may have to be calculated or re-calculated after completing the real-time recording, this requires only a short time, and remains substantially unnoticed by the user. Hence the user perceives a recording in one pass, while the record carrier still is compatible to the existing format and can be played on standard players, e.g. a DVD-video player.

Preferred embodiment of the device the recording means are arranged for recording elements of the control information on the record carrier during recording the real-time information. This embodiment has the advantage that less temporary memory is needed. In practice a substantial part of the control information consists of elements relating to the cells, e.g. a table of pointers to each cell. A first part of such a table can be saved from the temporary memory to the record carrier while the recording of further cells still continues, because this first part is not affected by the further cells.

These and other aspects of the invention will be apparent to those skilled in the art from and elucidated further with reference to the embodiments described by way of example in the following description and with reference to the accompanying drawings, in which

BRIEF DESCRIPTION OF THE DRAWINGS

FIG. 1 shows a record carrier,

FIG. 2 shows a recording device,

FIG. 8 shows video title set information in a video title set, FIG. 10 shows the structure, of program chain information, FIG. 15 shows information described in the data search general information, FIG. 16 shows information described in the seamless playback information, FIG. 17 shows the contents of the seamless angle information, FIG. 18 shows the VOBU search information.

DETAILED DESCRIPTION OF THE PREFERRED EMBODIMENT

Figure 3:
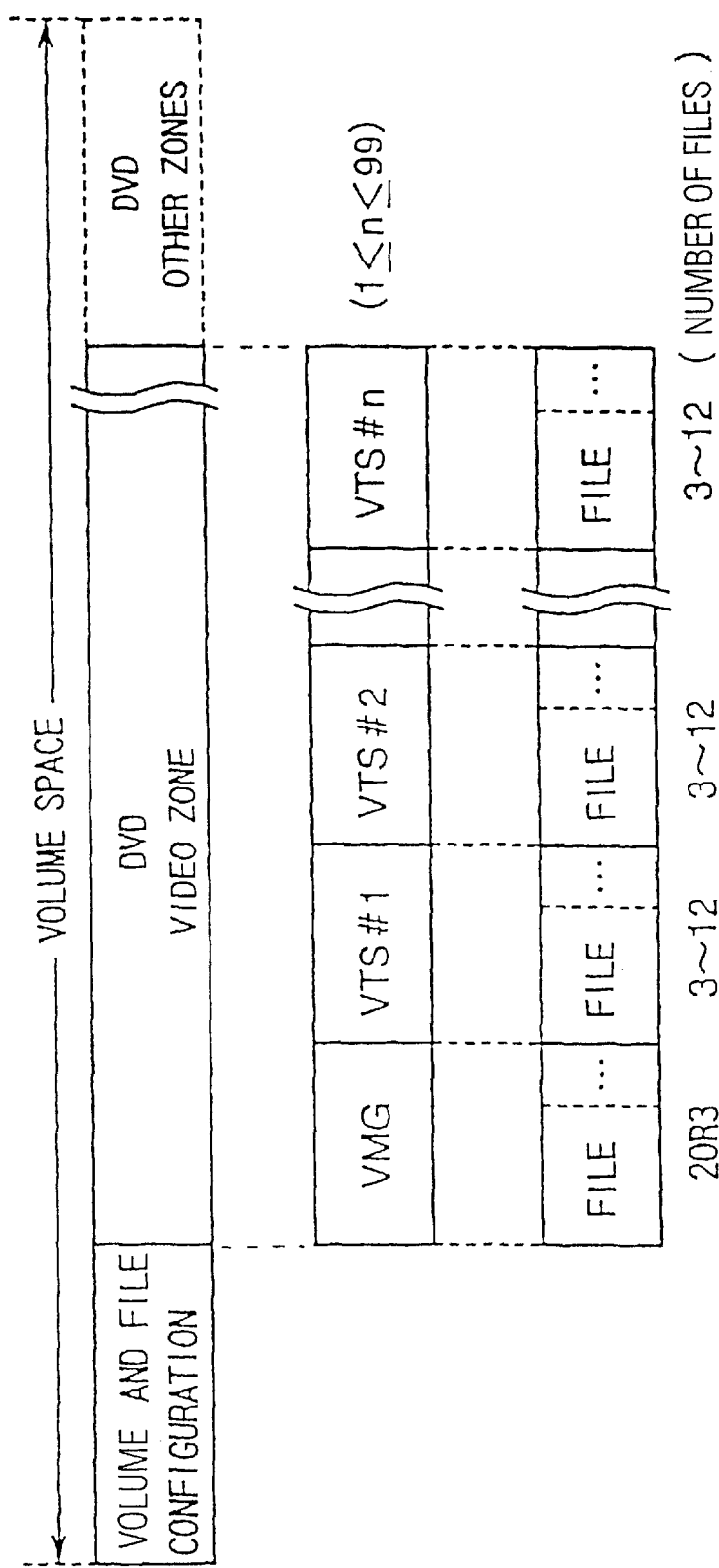
FIG. 3 shows volume space on an optical disk.

Corresponding elements in different Figures have identical reference numerals.

FIG. 1a shows a disc-shaped record carrier 11 having a track 9 and a central hole 10. The track 9 is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD-RAM and DVD+RW. The track 9 on the recordable type of record carrier is indicated by a pre-embossed track structure provided during manufacture of the blank record carrier. The track structure is constituted, for example, by a pregroove 14 which enables a read/write head to follow the track during scanning. The information is represented on the information layer by optically detectable marks recorded along the track, e.g. pits and lands.

FIG. 1b is a cross-section taken along the line b—b of the record carrier 11 of the recordable type, in which a transparent substrate 15 is provided with a recording layer 16 and a protective layer 17. The pregroove 14 may be implemented as an indentation or an elevation, or as a material property deviating from its surroundings.

The record carrier 11 is intended for carrying real-time information according to a standardized format, to be playable on standardized playback devices. The recording format includes the way information is recorded, encoded and logically mapped. The logical mapping may comprise a subdivision of the available area in a lead-in 18, a recording area for user data and a lead-out 19. Further the mapping may comprise file management information for retrieving the user information, such as a Table Of Contents or a file system, e.g. ISO 9660 for CD-ROM or UDF for DVD-ROM. Such file management information is mapped on a predefined location on the record carrier, usually in or directly after the lead-in area. However this document further relates to aspects of the format relating to the way the real-time information is recorded, i.e. format of the video and/or audio information and its corresponding control information. The record carrier 11 is provided with a starting point 13 for creating a free area 12 for accommodating control information related to recorded real-time information. The real-time recording process is described below with reference to FIG. 20.

FIG. 2 shows a recording device for writing information on a record carrier 11 of a type which is (re)writable. The device is provided with drive means 21 for rotating the record carrier 1, and a head 22 for scanning the track on the record carrier. The apparatus is provided with positioning means 25 for coarsely positioning the head 22 in the radial direction on the track. The head comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal coupled to said tracking and focusing actuators. The read signal is processed by a reading means of a usual type (not shown) to retrieve the information. The device comprises recording means for processing the real-time information to generate a write signal to drive the head 22. The recording means comprise an input unit 27, a formatting unit 28, a modulation unit 29 and a control unit 20 for receiving commands from a user or from a host computer. The control unit 20 is connected via control lines 26, e.g. a system bus, to said recording means and to the drive means 21, and the positioning means 25. The control unit 20 comprises control circuitry, for example a microprocessor, a program memory and control gates, for performing the procedures and functions according to the invention as described below with reference to FIG. 20. The control unit 20 may also be implemented as a state machine in logic circuits. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of a spot 23 generated on the recording layer via a beam 24 of electromagnetic radiation, usually from a laser diode. The recording means further include an input unit 27, a formatting unit 28, and a modulation unit 29. User information is presented on the input unit 27, which may comprise of compression means for analog audio and/or video, or for digital uncompressed audio/video. Suitable compression means are described for audio in WO 98/16014-A1 (PHN 16452) and for video in the MPEG2 standard. From the input unit 27 the data is passed to the formatting unit 28 for adding control data and formatting the data according to the recording format. The data stream to be recorded is passed to the modulation unit 29, which drives the head 22, and which comprises for example an error coder and a channel coder. The data presented to the input of the modulation unit 29 is written to sectors on the record carrier under the control of control unit 20. Usually the recording apparatus will also be arranged for reading having the reading and decoding means of a playback apparatus and a combined write/read head.

First a recording format is described. The format substantially corresponds to the DVD-Video standard.

FIG. 3 shows volume space on the optical disk 11. As shown in FIG. 3, the volume space consists of a volume and file configuration zone, a DVD-video zone, and other zones. In the volume and file configuration zone is described a UDF (Universal Disk Format Specification Revision 1.02) configuration, the data of which can be read by any computer that meets a predetermined standard. The DVD-video zone has a video manager (VMG) and a video title set (VTS). The video manager (VMG) and the video title set (VTS) each consist of multiple files. The video manager (VMG) is information for controlling the video title set (VTS).

Figure 4:
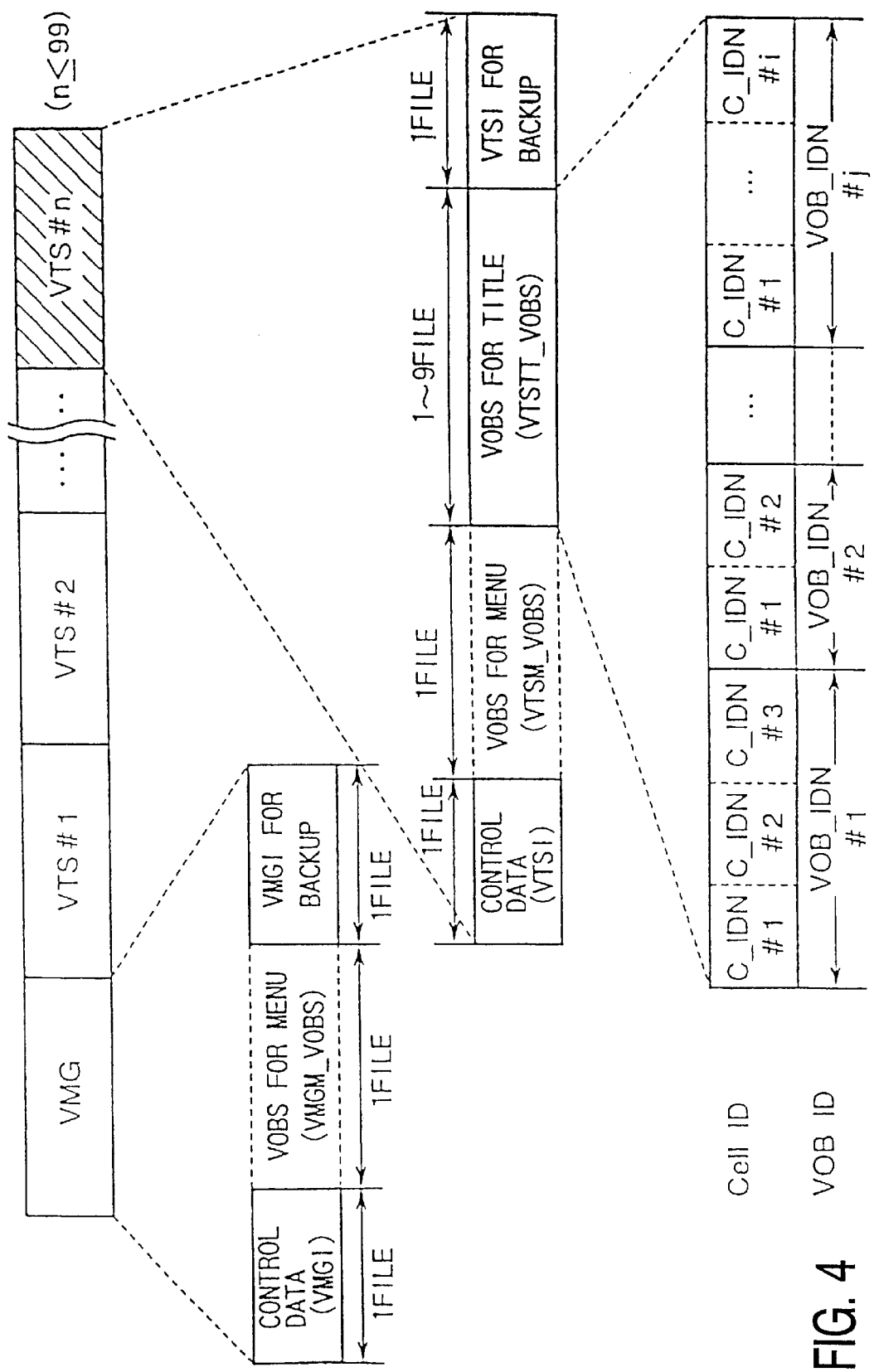
FIG. 4 shows the structures of the video manager and the video title sets in more detail.

In FIG. 4 shows the structures of the video manager (VMG) and the video title set (VTS) in more detail. The video manager (VMG) has video manager information (VMGI) as control data and a video object set (VMGM_VOBS) as data for menu display. Also, backup video manager information (VMGI_BUP) that is identical in content to the VMGI is included. The video title set (VTS) contains video title set information (VTSI) as control data, optionally a video object set (VTSM_VOBS) as data for menu display, and a video object set (VTSTT_VOBS) for the titles of a video title set that is a video object set for video display. Also, backup video title set information (VTSI_BUP) that is identical in content to the VTSI is included. The video object set (VTSTT_VOBS) for video display is made up by multiple cells in VOBs. Each cell in a VOB is assigned a cell identification number.

Figure 5:
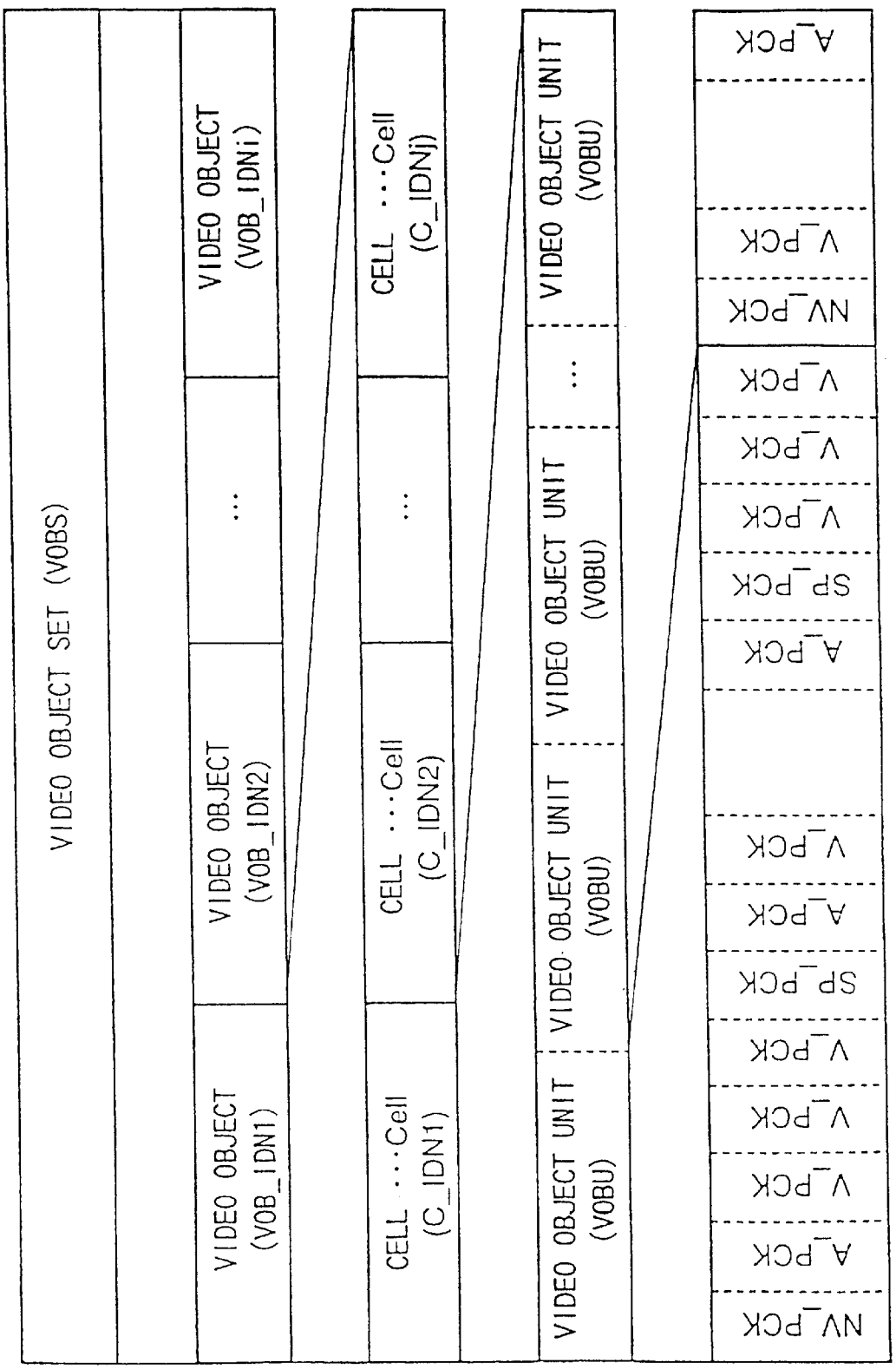
FIG. 5 shows a relationship between video object set and cells and the contents of the cells hierarchically.

FIG. 5 shows a relationship between the video object set (VOBS) and the cells and the contents of the cells hierarchically. When DVD playback processing is performed, video breaks (scene changes, angle changes, story changes, etc.) and special playback are handled in units of cells (Cell), or in units of interleaved units (ILVU), or in units of video object units (VOBU) that are in a layer below the cells. First, the video object set (VOBS) comprises multiple video objects (VOB_IDN1 to VOB-IDNi). Moreover, one video object comprises multiple cells (C_IDN1 to C_IDNj). Furthermore, one cell (cell) comprises multiple video object units (VOBU) or interleaved units that are described later. One video object unit (VOBU) comprises one navigation pack (NV_PCK), multiple audio packs (A_PCK), multiple video packs (V_PCK), and multiple subpicture packs (SP_PCK). The navigation pack (NV_PCK) is mainly used as control data for control of reproduced display of data in the video object unit to which it belongs and control data for search for data in the video object unit. The video pack (V_PCK) is main video information, which is compressed in accordance with the MPEG2 standard or the like. The subpicture pack (SP_PCK) is sub video information having contents that are auxiliary to main video, such as subtitles. The audio pack (A_PCK) is sound information.

Figure 6:
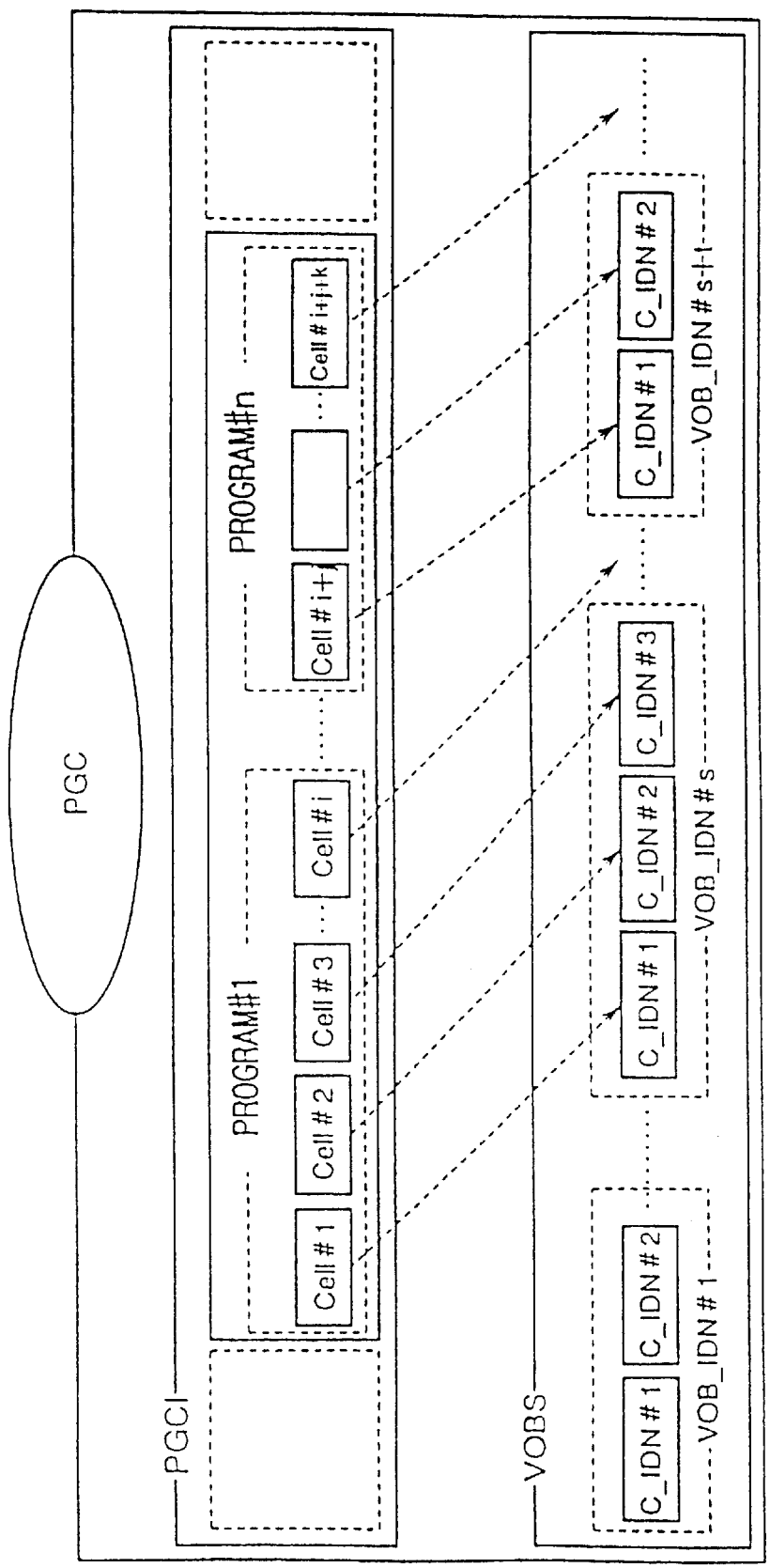
FIG. 6 shows a diagram of controlling the sequence of playback of the cells by a program chain.

FIG. 6 shows a diagram of controlling the sequence of playback of the cells (Cells) by a program chain (PGC). As the program chain (PGC), various program chains (PGC#1, PGC#2, PGC#3, . . . ) are prepared so as to allow the order of playback of data cells to be set variously. Therefore, the order of playback of cells will be set by making a choice among the program chains. An example in which program #1 to program #n described by program chain information (PGCI) are executed is shown. The program shown has the contents to specify a cell specified by (VOB_IDN#s, C_IDN#1) and subsequent cells within the video object set (VOBS) in turn. The program chain, recorded on the management information recording area of the optical disk, is information that is read prior to the reading of the video title set of the optical disk and then stored in the memory in the system controller. The management information is placed at the beginning of the video manager and each video title set.

Figure 7:
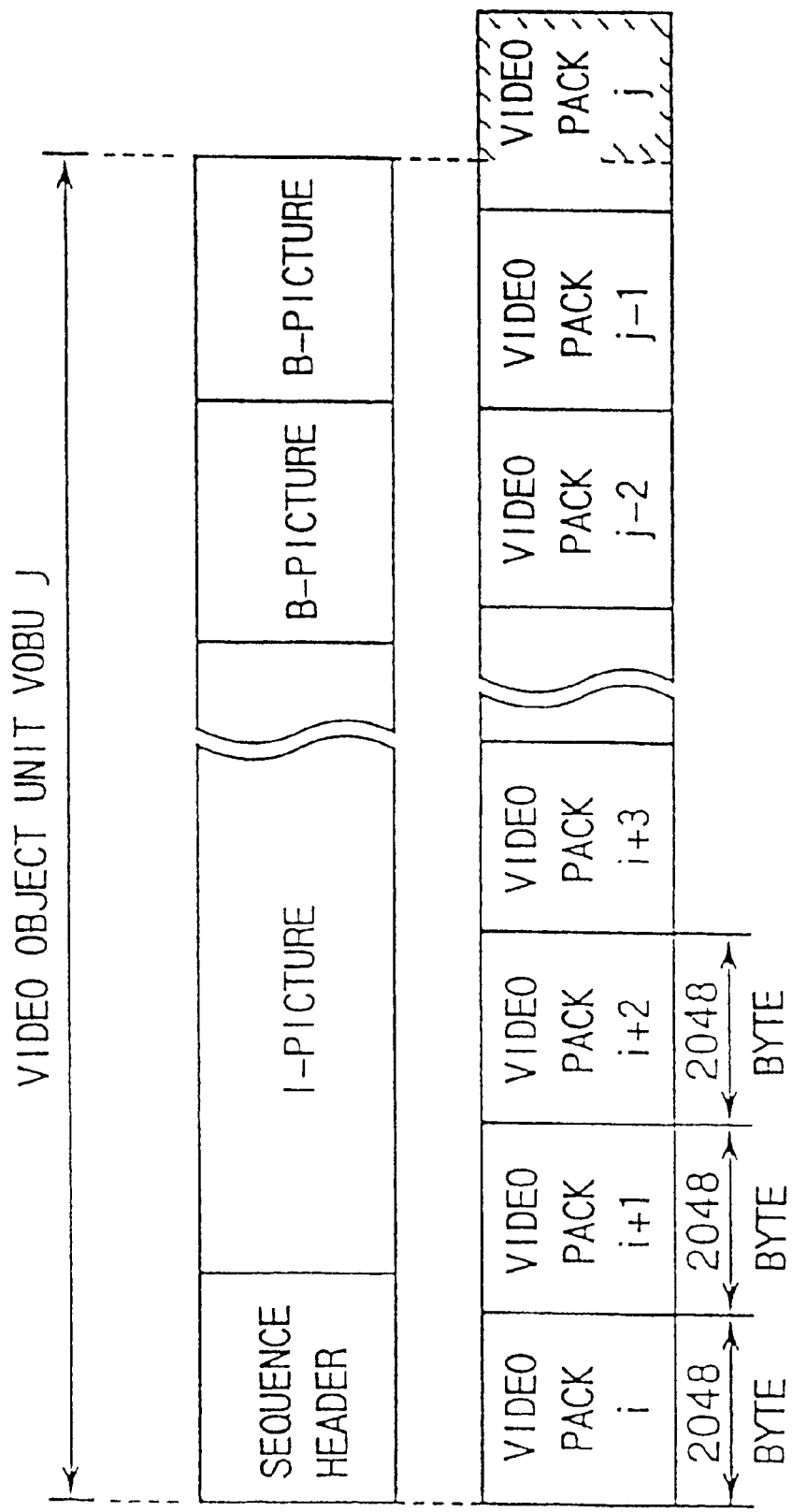
FIG. 7 shows a relationship between a video object unit and video packs in the unit.

FIG. 7 shows a relationship between a video object unit (VOBU) and video packs in it. Video data in VOBU comprises one or more GOPs (GOP=Group Of Pictures). Encoded video data conforms to MPEG2 (ISO/IEC13818-2) by way of example. The GOP in VOBU comprises an I-picture, and P- and B-pictures and the continuation of this data is divided into video packs. Next, a description is given of a data unit when multi-angle information is recorded and reproduced. When multiple scenes that differ in point of view for a subject are recorded on an optical disk, an interleaved-block portion is built on recording tracks to perform seamless playback. In the interleaved block portion, multiple video objects (VOB) that differ in angle are each divided into multiple interleaved units. The interleaved units are recorded in such an arrangement as allows seamless playback. Multiple stories may be interleaved on a kind of time division basis. In the description, all of the divided blocks were termed cells. Next, a description will be given of the interleaved units and management information used for playing back the interleaved units.

FIG. 8 shows video title set information (VTSI) in video title set (VTS). A video title set program chain information table (VTS_PGCIT) is described in the video title set information (VTSI). Thus, when a video object set (VOBS) in one video title set (VTS) is played back, a program chain is utilized which is specified by the producer or selected by the user from multiple program chains presented in the video title set program chain information table (VTS_PGCIT). In the VTSI, the following data are further described. VTSI_MAT is a video title set information management table, in which what kinds of information are present in this video title set and the starting and ending addresses of each item of information are described. VTS_PTT_SRPT is a video title set part-of-title search pointer table, in which entry points of titles and the like are described. VTSM_PGCI_UT is a video title set menu program chain information unit table, in which a menu of video title sets is described in various languages. Thus, the menu allows the user to determine what kind of video title set is described and what style of order playback can be performed in. VTS_TMAPT is a video title set time map table, in which information on the recorded position of each VOBU is described which is managed within each program chain and indicated at regular intervals of seconds. VTSM_C_ADT is a video tile set menu cell address table, in which the starting and ending address of each cell comprising the video title set menu and the like are described. VTSM_VOBU_ADMAP is a video title set menu video object unit address map, in which the starting addresses of menu video object units are described. VTS_C_ADT is a video title set cell address table, in which cell address information is described. When a program chain is selected in the playback apparatus, the order of playing back cells is set by that chain. In playback, NV_PCK included in the video object unit is referred to. NV_PCK has information for controlling display contents and display timing and information for data search. Thus, the retrieval and decoding of V_PCK are performed on the basis of information in the NV_PCK table. In addition, another pack is retrieved and decoded, in which case A_PCK and SP_PCK in a language specified by the producer or user are retrieved.

Figure 9:
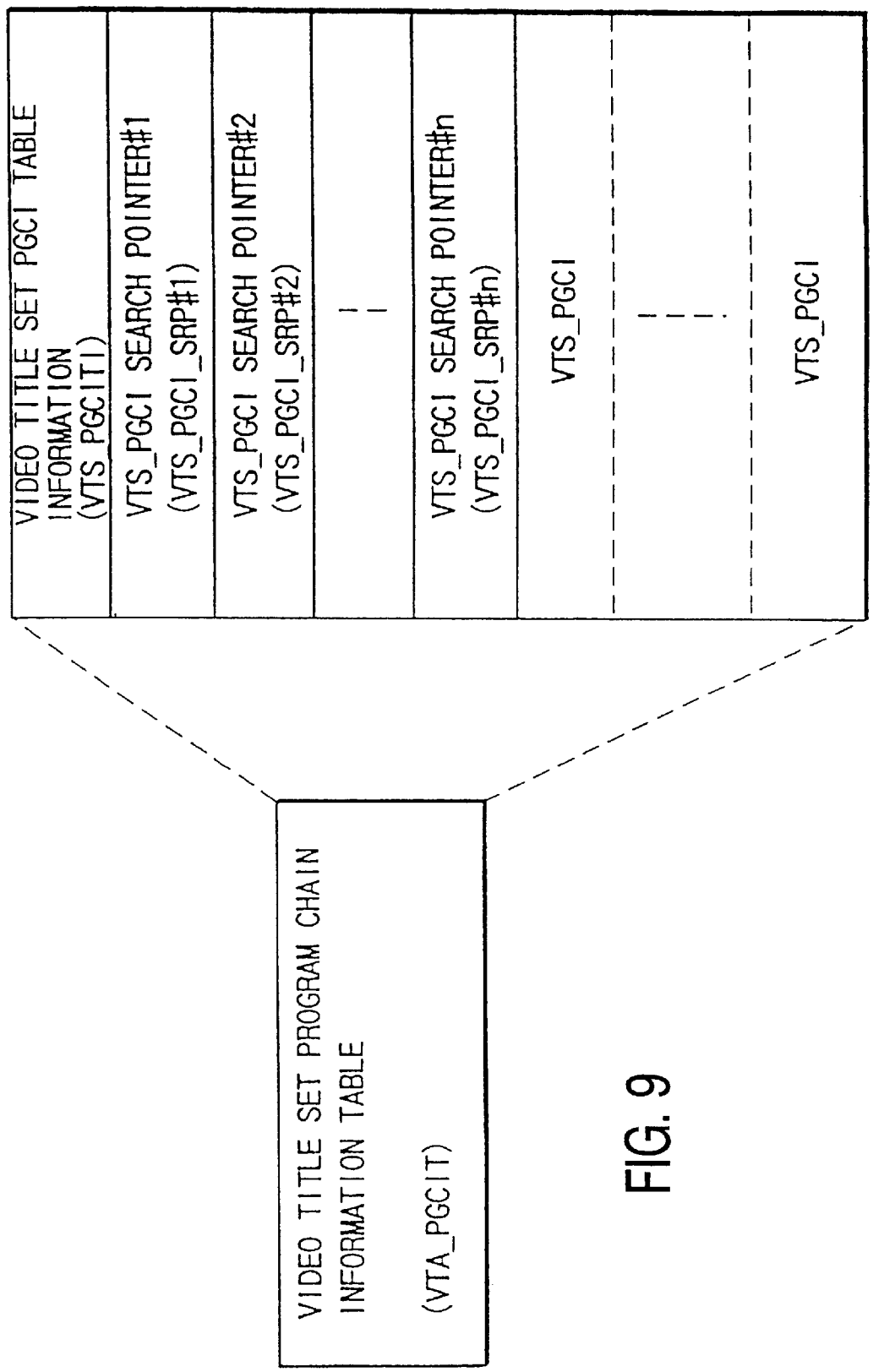
FIG. 9 shows the contents of a video title set program chain information table.

FIG. 9 shows the contents of the video title set program chain information table (VTS_PGCIT). In this table are described video title set PGCI table information (VTS_PGCITI), search pointers (VTS_PGCI_SRP#1 to #n) for video title set program chain information, and specific program chain information (VTS_PGCI). In (VTS_PGCITI) are described the number of search pointers and the ending address of this table. In (VTS_PGCI_SRP#1 to #n) are described, as the category of the video tile set program chain, the number of titles in a video title set that becomes a target, whether the program chain ends with one block or continues into a chain in another block, etc. In addition, the starting address of the video title set program chain is described in terms of the relative address to the starting position of this table.

FIG. 10 describes the contents of program chain information (PGCI). The PGCI contains program chain general information (PGCI_GI), a program chain command table (PGC_CMDT), a program chain program map (PGC_PGMAP), cell playback information (C_PBI), and cell position information table (C_POSIT). In the PGCI_GI are described the number of programs and the number of cells for this program chain (this information is called PGC contents (PGC_CNT)). In addition, all the playback times that the program chain intends are shown (this information is called PGC playback time (PGC_PB_TM)). Moreover, a code of whether a program played back by this program chain allows user operation, for example, whether the switching of angles is possible, is described (this information is called PGC user operation control (PGC_UPR_CTL)). Furthermore, codes of whether audio streams can be switched and what type of audio stream (e.g. linear PCM, AC-3, MPEG or the like) can be switched into are also described (this information is called PFC audio stream control table (PGC_AST_CTLI). In addition, codes of whether subvideos can be switched and what type of subvideo (e.g., a different aspect ratio) can be switched into are described (this information is called PGC subvideo stream control table (PGC_SPST_CTLT). Moreover, in this PGCI_GI, the next program chain number and the previous program chain number are also described. Furthermore, whether the program intended by this program chain is intended for continuous playback, random playback, or shuffle playback is also described (this information called PGC navigation control (PGC_NV_CTL). In addition, color specification is performed to indicate what colors subvideo is to be displayed in (this information is called PGC subvideo palette (PGC_SP_PLI)). Also, the starting address of the program chain command table (PGC_CMDT_SA), the starting address of the program chain program map (PGC_PGMAP_SA), the starting address of the cell playback information table (C_PBIT_SA) and the starting address of cell position information (C_POSI_SA) are described. In the program chain command table are described the pre-commands and post-commands of the program chain and cell commands. The pre-commands are ones to be processed prior to the execution of the program chain and the post-commands are ones to be processed after the execution of the program chain. The pre-commands and post-commands are used to define the video title, the reproduced state of audio, and the reproduced stream on the basis of commands or parameters decided in advance on the player side or the disk producer side. The cell commands are ones to be processed subsequent to the execution of playback processing of cells. In the starting address of the program chain program map (PGC_PGMAP), the structure of a program for which the program chain is intended is indicated and entry cell numbers of an existing program are described. In the cell playback information table (C_PBIT) is described information indicating the order of playing back cells for which the program chain is intended.

Figure 11:
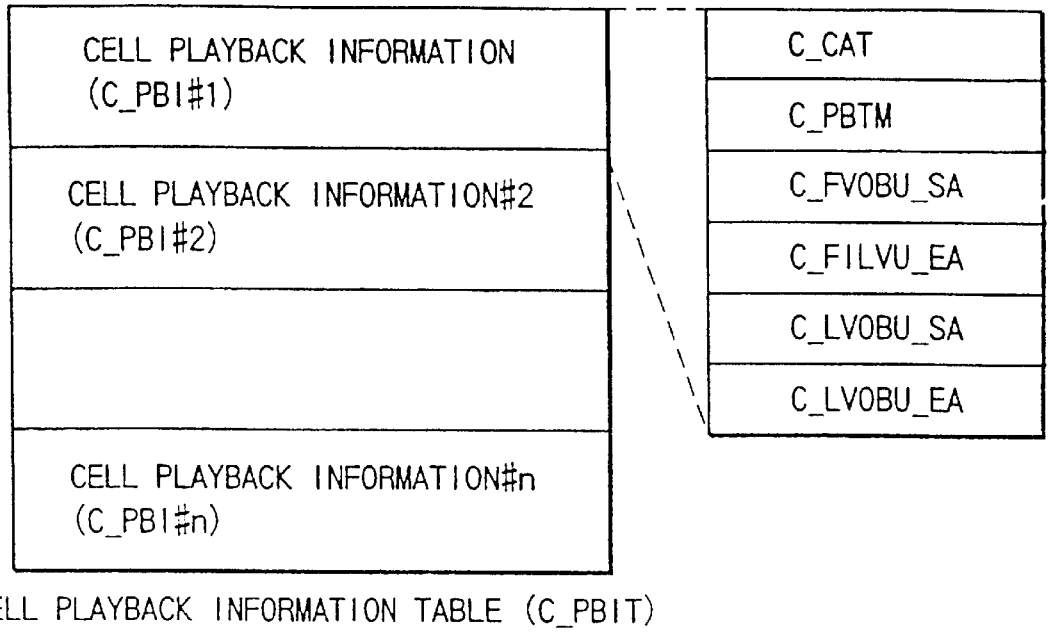
FIG. 11 shows cell playback information and the contents thereof.

FIG. 11 shows cell playback information (C_PBIT) and its contents. The C_CAT is cell attribute information and indicates the mode of a cell block. The mode of a cell block indicates whether the cell is the first one or the last one. Also included are information as to whether seamless playback is to be performed, information as to whether the cell block is among interleaved blocks, and information about seamless angle switching. The information about seamless angle switching indicates that the angle switching can be made either seamlessly or non-seamlessly. C_PBTM indicates the cell playback time, C_FVOBU_SA the starting address of the first video object unit (VOBU) of the cell, C_ILVU_EA the ending address of the first interleaved unit (ILVU) of the cell, C_FVOBU_SA the starting address of the last video object unit (VOBU) of the cell, and C_FVOBU_EA the ending address of the last video object unit (VOBU) of the cell. The addresses are described in terms of logical block numbers relative to the first logical block of VOB to which the cell belongs. By referring to the cell playback information, a determination can be made of whether the current playback state reaches the end of a cell. When the next cell is played back the next cell playback information in the cell playback information table is referred to determine the starting address of the first VOBU of the next cell (or interleaved unit).

Figure 12:
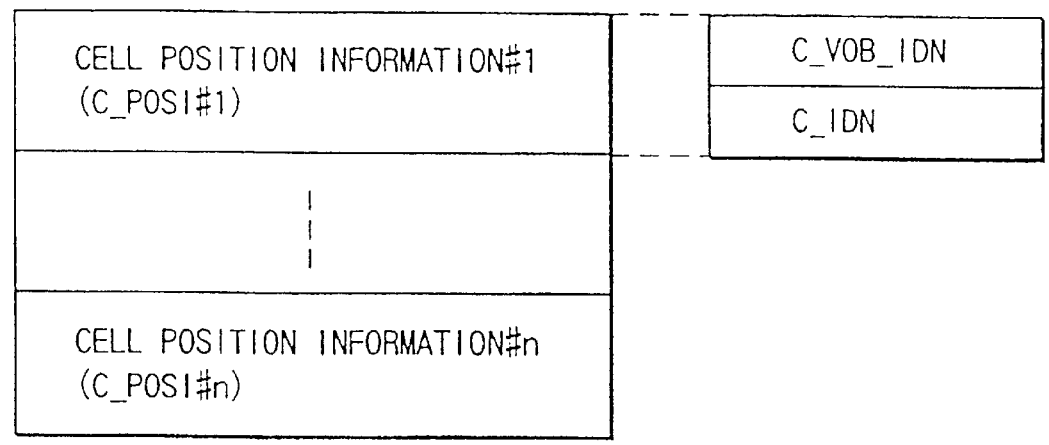
FIG. 12 shows the contents of a cell position information table.

FIG. 12 shows the contents of the cell position information table (C_PSIT). The cell position information includes the ID number of a video object (C_VOB_IDN) in which the cell is contained and the cell ID number (C_IDN) of the cell. As described above, the management information describes cell playback information, in which there is cell attribute information indicating whether interleaved units for multiple angles or the like have been recorded. When a multi-angle video or a multi-story video is recorded, the playback apparatus needs to switch from the angle being played back to the other or switch from the story being played back to the other according to user's operation. In this case, the playback apparatus responds to the user's operation on the basis of the following information. First, the structure of a pack will be described.

Figure 13:
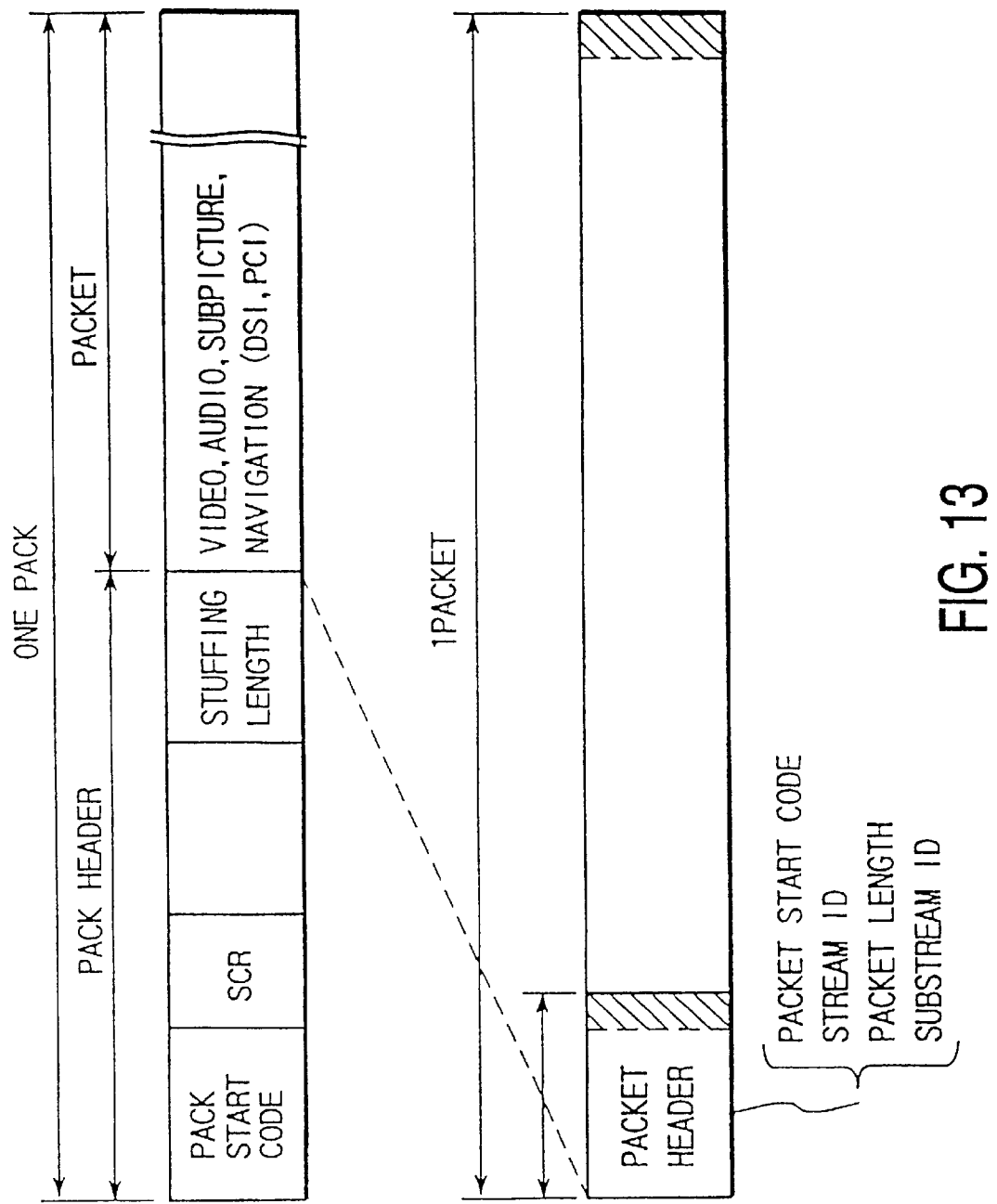
FIG. 13 shows the formats of a pack and a packet recorded on an optical disk.

FIG. 13 shows the formats of one pack and one packet. One pack comprises a pack header and a packet. In the packet header are described a pack start code, a system clock reference (SCR), etc. The pack start code is one indicating the beginning of the pack, and the system clock reference (SCR) is information indicating to the entire playback apparatus the reference time in the playback elapsed time. One pack is defined and recorded as one logical block on an optical disk. One packet comprises a packet header and video data or audio data or subpicture data, or navigation data. Stuffing may be provided in the packet header. Padding may be provided in the data division of the packet.

Figure 14:
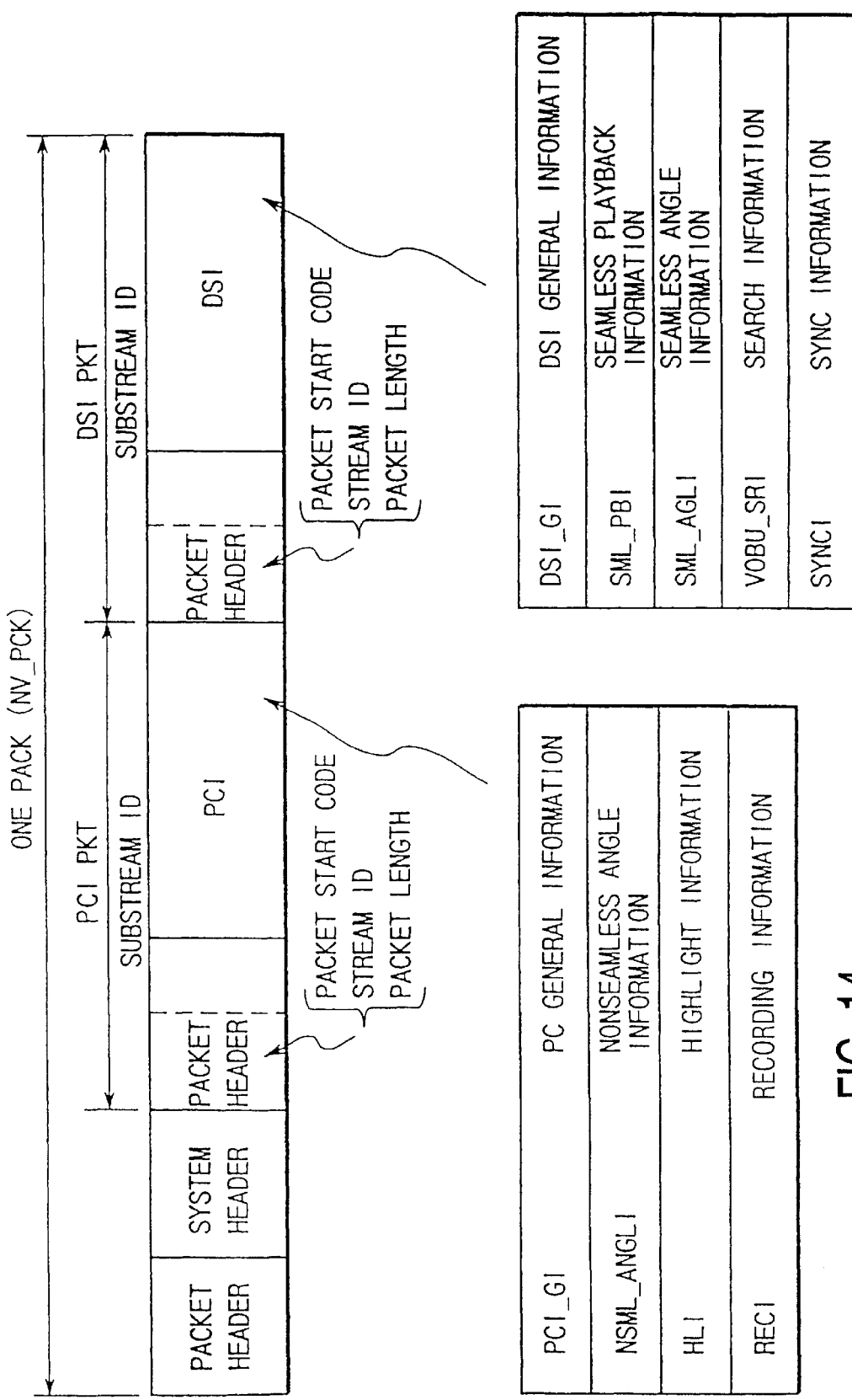
FIG. 14 shows an NV_PCK pack.

FIG. 14 shows the NV_PCK (see FIG. 5). The NV_PCK includes a picture control information (PCI) packet basically adapted to control display pictures and a data search information (DSI) packet existing in the same video object. In each packet are described a pack header and a substream ID, followed by data. In each pack header is described a stream ID, indicating NV_PCK. The substream ID is used to distinguish between PCI and DSI. In each pack header are described a packet start code, a stream ID and the packet length, followed by data. The PCI packet is navigation data for changing display contents synchronously with the playback of video data in a video object unit (VOBU) to which the NV packet belongs. In the PCI packet are described PCI general information (PCI_GI) that is general information, non-seamless angle information (NSML_ANGLI), highlight information (HLI) and recording information (RECI) that is recorded information. In the PCI_GI is described PCI general information, which includes: the logical block number (NV_PCK_LBN) that is the address of the navigation pack, the video object unit category (VOBU_CAT) indicating the attribute of a video object unit (VOBU) managed by the PCI, the user operation control (VOBU_UPO_CTL) that is user operation inhibit information in the display period of the video object unit managed by the PCI, the video object unit display starting time (VOBU_S_PTM), and the video object unit display ending time (VOBU_E_PTM). The first picture specified by the VOBU_S_PTM is an I-picture in the MPEG standards. Further, video object unit sequence end presentation time (VOBU_SE_E_PTM) indicating the display time of the last video in the video object unit, the cell elapsed time (C_ELTM) indicating the display elapsed time relative to the first video frame in a cell and so on are also described. The NSML_ANGL indicates the destination address when an angle change is made. That is, the video object unit includes pictures shot from different angles. The address of a VOBU is described to which a transition is made for the next playback when the display of pictures shot from a different angle from the current one is specified by the user. The HLI is information for specifying a specific rectangular area on the screen and changing the brightness of that area or the color of subvideo displayed therein. The information includes highlight general information (HL_GI), a button color information table (BTN_COLIT) used when the user makes a selection among buttons for color selection, and button information table (BTNIT) for select buttons. The RECI is information about video, audio and subpicture recorded in the video object unit, each item of information describing what data to be decoded is like. For example, a country code, a copyright owner code and the date of recording are included. The DSI packet is navigation data for making a search for a video object unit. In the DSI packet are described DSI general information (DSI_GI), seamless playback information (SML_PBI), seamless angle information (SML_AGLI), video object unit search information (VOBU_SRI), and sync information (SYNCI).

As shown in FIG. 15, in the DSI_GI is described the following information: a system clock reference indicating the reference time for starting decoding the NV_PCK (NV_PCK_SCR), the logical address of the NV_PCK (NV_PCK_LBN), the ending address of the video object unit to which the NV_PCK belongs (VOBU_EA), the ending address of the first reference picture (I-picture) to be decoded first (VOBU-1STREF-EA), the ending address of the second reference picture (I- or P-picture) to be decoded first (VOBU-2NDREF_EA), the ending address of the third reference picture (I- or P-picture) to be decoded first (VOBU_3RDREF_EA), the ID number of the VOB to which the DSI belongs (VOBU_VOB_IDN), the ID number of the cell to which the DSI belongs (VOBU_C_IDN), and the cell elapsed time indicating the elapsed time relative to the first video frame in the cell (C_ELTM).

As shown in FIG. 16, in the SML_PBI is described the following information: video object unit seamless category indicating whether the VOBU to which the DSI belongs is an interleaved unit (ILVU) or a pre-unit (PREU) that is the criterion for indicating the connection between video objects, the ending address of the interleaved unit (ILVU_EA), the starting address of the next interleaved unit (ILVU_SA), the size of the next interleaved unit (ILVU_SZ), the video display starting time in the video object (VOB) (VOB_V_S_PTM), the video display ending time in the video object (VOB) (VOB_V_E_PTM), the audio stopping time in the video object (VOB) (VOB_A_STP_PTM), and the audio gap length in the video object (VOB) (VOB_A_GAP_LEN). The pre-unit (PREU) is the last unit immediately before the interleaved unit. In the video object unit seamless, category (VOBU_SML_CAD are further described a flag indicating whether or not the interleaved unit is one at the starting time and a flag indicating whether the interleaved unit is one at the ending time.

FIG. 17 shows the contents of the seamless angle information (SML_GLI). C1 to C9 indicate the number of angles. Even if a maximum of nine angles exists, the addresses and sizes of their destination interleaved units can be indicated. That is, the addresses and sizes (SML_ADL_Cn_DSTA) (n=1 to 9) of interleaved units that are destinations for the respective angles are described. When the user performs an operation of changing the angle while watching video, this operation information is referenced to, thereby allowing the playback apparatus to recognize the playback position of the next interleaved unit.

FIG. 18 shows VOBU search information (VOBU_SRI) which is referenced to at the time of special playback, etc. The information describes the starting addresses of VOBUs (0.5×n) seconds before and after the starting time of the current video object unit (VOBU). That is, the starting address of each of +1, +20, +60, +120 and +240 VOBUs as forward addresses (FWDIn) and a flag that a video pack is present in the unit are described according to the order of playback with the VOBU containing the DSI being referenced to. The starting address is described in terms of the number of logical sectors relative to the leading logical sector in the VOBU.

Figure 19:
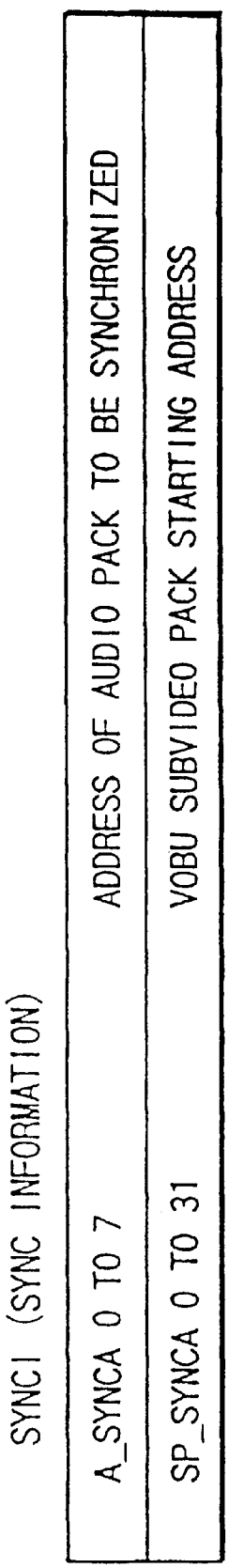
FIG. 19 shows the structure of audio synchronization information.

FIG. 19 shows sync information. In this sync information are described the address of an object audio pack to be synchronized and the VOBU starting address of an object video pack to be synchronized.

The above-described management information is described on an optical disk The system controller of the playback system makes a reference to the program chain information in the video manager to thereby acquire cell playback information. By referring to the cell attribute information, whether interleaved unit blocks for multiple angles have been recorded is recognized. When the interleaved unit blocks have been recorded, seamless playback information and seamless angle information in the NV_PCK are acquired and stored in the butter memory in the middle of playback. When angle switching information is entered by the user, the seamless angle information is referenced to, whereby the playback of interleaved units for the angle specified by the user is started. Then, reference is made to the seamless cell playback information contained in the acquired NV_PCK to recognize the interleaved unit to be played back next. By referencing to the cell playback information, a decision can be made as to whether it is the end of a cell that is currently played back. To play back the next cell, reference is made to the next cell playback information in the cell playback information table to determine the starting address of the first VOBU of the next cell.

According to the invention the control unit 20 of the recording device as shown in FIG. 2 is arranged for recording real-time information according to the following method.

Figure 20:
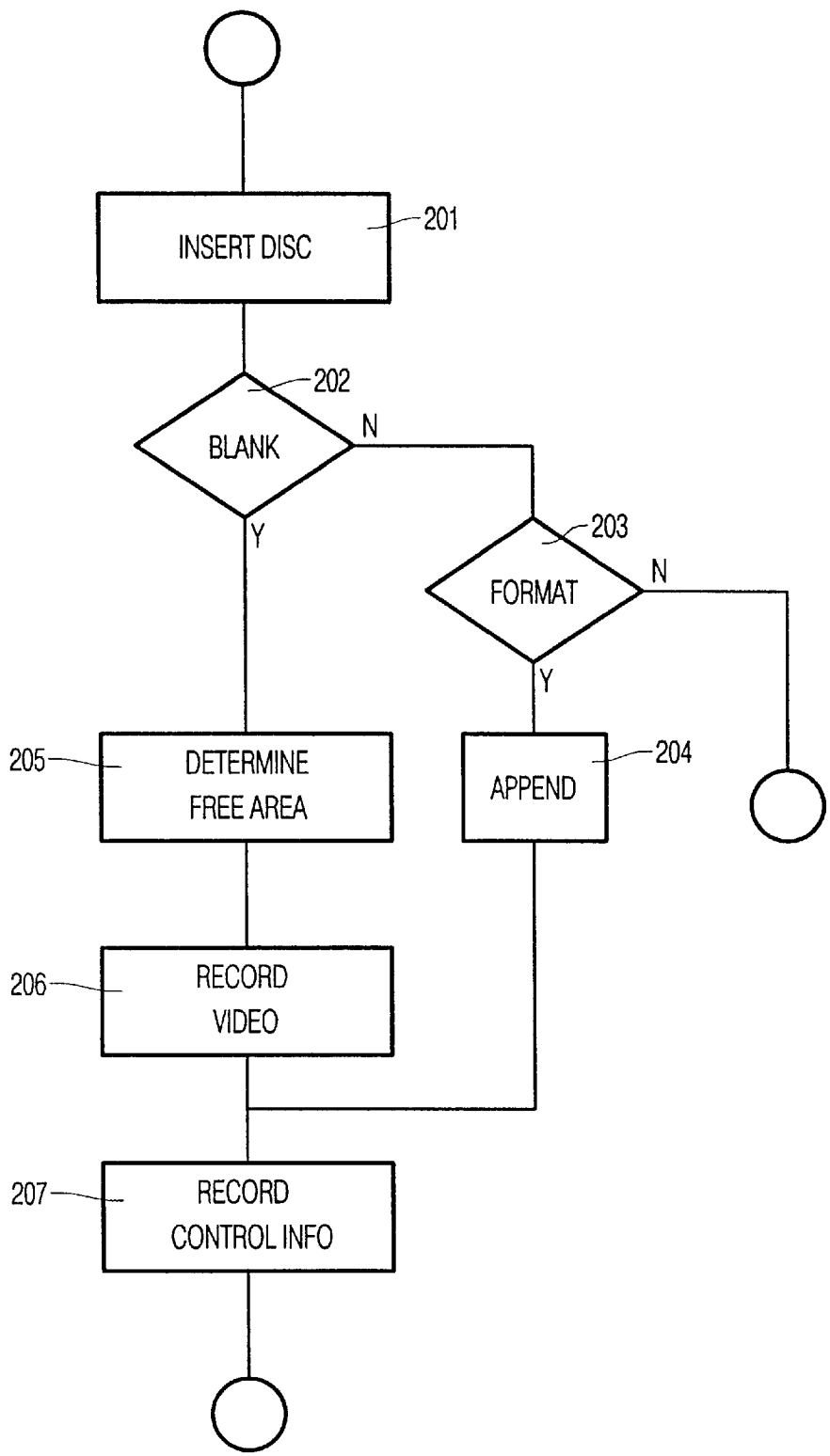
FIG. 20 shows the recording method according to the invention.

FIG. 20 shows a real-time recording method for recording real-time information according to a recording format. For the below example the DVD-video format as described above, is used. In a first step 201 a record carrier is inserted in a recording device and verified as to be of a writable type. In a first test 202 it is decided, that if the record carrier is not blank (i.e. contains already some information), a second test 203 is performed. If information according to the DVD format is already present on the record carrier, an append process 204 is performed as described below. If other information according to some unknown format is present, the record carrier is not accepted for recording. If the record carrier is blank, in the next step 205 a free area 12 is reserved at the beginning of the recording area by determining a starting point 13 for recording, which free area is large enough to accommodate the DVD control information. In FIG. 1a the free area 12 is shown schematically. The first part of the control information is VGMI (shown in FIG. 4), and the first part of each VTS is VTSI. For VMGI and VMGI_BUP a few kB and for VTSI and VTSI_BUP approximately 4 MB are reserved (the calculation is given below). In a next step 206 the audio/video is recorded starting at the starting point 13. The following information is accumulated: For VMGI the number of chapters and for VTSI the number of chapters, a list of cell addresses, a list of VOBU addresses, including Presentation Time Stamps (for VTS_TMAPT calculation), cell duration's and which cell belongs to which program (may be one-to-one). When the recording of audio/video is completed at a next step 207 the control data is recorded, i.e. VMGI, VMGI_BUP, VTSI and VTSI_BUP.

If all the options of the DVD format were allowed for real-time recording, the free area required to accommodate all possible combinations of parameters is very large and reduces the available area for the video information substantially. Therefore a free area is created by making selective limitations to some parameters or combinations of parameters to have a workable requirement for the size of the free area. In an embodiment the following limitations to the DVD-video system have been made: the disc will not make use of Menus, the disc will not make use of Parental Management, the disc will not make use of the Text Data Manager, only one Video Title Set VTS will be recorded onto the disc, one recording consists of one or more VOBs, every recording corresponds to one (linear) DVD-video Title, and every title is one PGC. The first selection is to limit the number of VTS to one per disc. This has the advantage, that the user can create play-lists by editing the PGC's, which point to the basic CELLs. Using one VTS allows a PGC to access any CELL of the recorded material, whereas more than one VTS would not allow this, because a PGC cannot span VTSs. Hence the user may create several compilations of the recorded material including any selected CELL. A play-list can be edited in several ways after the end of the real-time recording, without actually changing the recorded audio/video material., e.g. removing chapters from a title, reordering chapters in a title, merging titles, adding a new title from a selection of chapters from different titles. This requires updating the respective tables in VGMI and VTSI For real-time recording VGMI the following data is generated: VGMI_MAT, TT_SRPT (includes the number of chapters) and VTS_ATRT. This information includes fixed or pre-defined parameters, and address pointer which can be easily calculated. VMGI_MAT, TT_SRPT, and VTS_ATRT start on the nearest 2048 byte boundary (logical block), and to this end a maximum of 2047 padding bytes is allowed. Maximum size of each block:

VMGI_MAT=>2292 bytes (maximum, but 1260 is more likely)

TT_SRPT=>1196 bytes

VTS_ATRT=>788 bytes

This would result in a maximum VMGI size of 4 sectors (but more likely 3 sectors in practice), and therefore 4 sectors as well for the VMGI_BUP file. Note that VMGI and VMGI_BUP can not reside in the same ECC Block (1 ECC Block==16 sectors), so empty sectors must be inserted, or a menu VOBS as shown in FIG. 4. Video Title Set Information (VTSI) requires VTSI_MAT, VTS_PTT_SRPT, etc. (as shown in FIG. 8), which start on the nearest 2048 byte boundary (logical block), and also a maximum of 2047 padding bytes is allowed. For the number of cells a maximum of 255 is taken, but this could be restricted to 99, which would result in a smaller free area on the disc. Maximum size of each block (#t is number of titles=max 99, #ch is number of program chains=max 99, #c is number of cells= max 255):

VTSI_MAT=>2048 bytes (fixed)

VTS_PTT_SRPT=>39608 bytes (8+4*99+4*99*99)

VTS_PGCIT=>740825 bytes (8+#t*(8+236+#ch+ 28*#c))

VTS_TMAPT=>811808 bytes (8+#t*(8+2048*4))

VTS_C_ADT=>302948 bytes (8+#t*#c*12)

VTS_VOBU_ADMAP=>144004 bytes (4+4*(4*3600/ 0.4))

The maximum total VTSI size is 2041241 bytes (i.e. 1+20+ 362+397+148+71=999 and therefore 999 sectors as well for the VTSI_BUP file. Note that VTSI and VTSI_BUP can not reside in the same ECC Block (1ECC Block==16 sectors). For VTSI the following data is generated: VTSI_MAT, VTS_PTT_SRPT (calculate using the number of chapters), VTS_PGCIT (calculate using number of chapters, number of cells and their relations with chapters, cell duration's and cell addresses), VTS_TMAPT (requires list of VOBU addresses and corresponding PTS; Time Unit interval can be calculated using the duration information of the recording session), VTS_C_ADT (complete list of cell addresses) and VTS_VOBU_ADMAP (list of VOBU addresses).

An estimation for a required temporary memory for generating the above playback parameters during recording (e.g. 4 hour recording time) is:

| | |
|---|---|
| Number of chapters | 1 byte |
| Cell addresses | 3060 bytes (12 * 255) |
| VOBU addresses and PTS (VOBU address = 4 bytes, PTS = 4 bytes, VOBU = 0, 4 sec) | 288000 bytes |
| Cell duration's | 1020 bytes |
| Cell/Program map | 99 bytes |
| Total | 292180 bytes |

This data can be stored in a solid state memory (RAM ICs), or it may be stored on a temporary location on the record carrier. In practice a choice between efficiency (speed) and the required amount of memory is made. Less memory would require more use of the record carrier as temporary storage space. In an embodiment VOBU size and VOBU duration can be fixed, and hence memory can be saved: VOBU start addresses can be calculated, and VOBU PTSs are linear to VOBU start addresses. In an embodiment the list VTS_TMAPT is omitted, as this list is not mandatory in DVD. The total VTSI size and required temporary memory can be recalculated by eliminating the VTS_TMAPT and VOBU addresses contributions When the user starts recording new material on a partly filled disc, he may choose to append to the existing VTS, or a new VTS may be created. The recorder may also make the decision for the user, e.g. always append to the existing VTS. Advantages of creating a new TS:
  Previous VTSs do not require changes in the control data,
  More cells (and thus chapters) are available per recording (note that a VOBS may contain upto 65535 VOBs, and 255 cells per VOB),
  For the consumer at home; he can define more chapters on the disc;
and disadvantages:
  Program chains can not go over VTS boundaries, so creation of a title that contains selected chapters from different VTSs needs to exist of more than one PGC. (Control Data will then be much more complex in order to link the different PGCs, and playback of different PGC is not seamless on most DVD-video players),
  The size estimate of VMGI is influenced slightly; for every VTS an extra 788 bytes are required for the VMGI.

The real-time append process 204 is as follows when information is appended to the existing VTS. Since it is assumed that only one VTS is recorded onto a disc, the appending of a next recording must take place within that VTS. The following steps are taken, when appending to a disc containing one or more recordings already:

Start recording video/audio and keep track of the following info
  For VMGI: Number of chapters
  For VTSI: Number of chapters, a complete list of cell addresses, a complete list of VOBU addresses, including Presentation Time Stamps (for VTS_TMAPT calculation), Cell duration's, which cells belong to which program (can be one-to-one),
Quit recording and write the VMGI, VMGI_BUP:
  Read old VMGI into memory (only 3 or 4 sectors),
  Alter the TT_SRPT information:
    Increase TT_SRP_Ns,
    Fill in the correct TI_SRPT_EA,
    Append a TT_SRP structure to the existing one,
    Write VMGI and VMGI_BUP back to disc
Write VTSI, VTSI_BUP
Different methods can be applied here to create the VTSI (and VTSI_BUP) with the new information included (depending on the available memory). The main issue is that some sector aligned structures (VTS_PTT_SRPT, VTS_PGCIT, etc.) will grow in size (and may cross sector boundaries). Therefore existing information must be shifted forward in the VTSI table. Memory required is equal to the ones in the first real-_time recording.

A further limitation is the number of VOB per recording. One VOB is the minimum restriction used above. More than one VOB per recording allows more than 255 cells per recording (although one program chain is still limited to 99 chapters (and 255 cells)), and there are no specific user disadvantages. Technically the VTSI size is influenced when allowing multiple VOBs per VOBS. The VTS_C_ADT table is larger, due to the increase in cells allowed. In the case when one cell equals a VOBU (worst case), and a 4 hour movie:
  VTS_C_ADT=>432008 bytes
    (36000 cells in 4 hour movie)
    (8+36000*12)
When a recording has more than one Program Chain (Multi_PGC_Titles), this has the advantage, that the maximum number of chapters for a title is then limited to 999 (instead of 99), while 999 is also the maximum number of chapters allowed in the complete VTS, and the disadvantage, that transition from one PGC to the next is not guaranteed to be seamless in the DVD-video Specifications (the screen shall be frozen until a new presentation is available). Multi_PGC will influence the size estimates of the VTSI:
  VTS_PTT_SRPT=>4400 bytes
    (8+#titles*4+#programs*4)
    (8+99*4+999*4)
    (i.e. only 999 programs per VTS)
  VTS_PGCIT=>245228236 bytes
    (Maximum of 32767 PGCIs)
    (8+7476 bytes per PGCI and PGCI_SRP)
    (This implies 32767 PGCIs each consisting of 99 Programs, and 255 cells (theoretically))
In practice a limitation can be applied by allowing 999 Programs in one VTS, and no more than 999 PGCs (one for each Program). In that case:
  VTS_PGCIT=>7378622 bytes
    (Maximum of 999 PGCIs)
    (8+7378 bytes per PGCI and PGCI_SRP)
    (This implies 999 PGCIs each consisting of 1 Programs, and 255 cells)
Not all DVD players allow titles to be selected through a player menu. Therefore, the existence of disc defined menus, would be desirable. So a free area can be created for adding menus after recording is completed. These disc menus can be generated automatically, for example for every 5 titles on the disc a menu-page is created. If the recorder is equipped with Menu Editing capabilities, menus can be provided with actual text titles. If still encoding is implemented in the recorder, recorded still material can be used as background for menus. Several technical solutions can be used for implementing these menus:

Subpictures for highlights only, text encoded in the background: this method requires a still encoder to be available in the DVD-video Recorder. The text is rendered into a bitmap, which is encoded into an MPEG2 Video Still, and multiplexed with a subpicture (which are run-length encoded bitmaps) into a VOB (subpicture encoding must be available in the Recorder as well).

Subpictures for both highlights and text (fixed background still): this method does not require any still encoding functionality in the DVD-video Recorder. Only subpicture encoding must be implemented in the Recorder. The fixed background MPEG2 Video still is multiplexed together with the subpicture into a VOB.

Both methods require a character set (images) to be available for rendering the menu content.

A default positioning can be chosen for titles, buttons, etc. Maximum still size in DVD-video is 224 Kb. A maximum subpicture size is 52 Kb. Roughly estimating a multiplexer overhead of 10%, this would result in a menu size of approximately 304 Kb.

In DVD-video menus can be defined in the Volume Manager (called Title Menus), or Video Title Sets (called either Root, Audio, Subpicture, Angle, or Chapter Menu). These different types of menus map onto menu buttons on the remote control. Whether the menus are placed in the VMG or in the VTS is not important; the free area has to be reserved anyway. Also an extra PGC structure is required for a set of menus:

3108 bytes
(236+29*#menus)
(maximum of 99 menus in a PGC)

Plus overhead for: VMGI=>32 bytes or, VTSI=>16 bytes

It is to be noted that in addition to recording of real time information and related control data some file management data in the UDF and/or ISO format has to be updated to reflect the newly recorded information. File management data or Table Of Contents data are well known, e.g. from CD-ROM and CD-audio. Such data is at least partly located outside the recording area, for example a fixed area at a predefined location on the record carrier, e.g. for DVD a Volume and File Configuration as shown in FIG. 4 located before the recording area "DVD-VIDEO ZONE". Further some file management data may be stored in freely re-locatable files recorded at an arbitrary location within the recording area. In practice the number of directories may be limited, e.g. to two: "ROOT" and "VIDEO_TS".

Although the invention has been explained by embodiments using the DVD-video format, it may be applied for any format for real-time data requiring non-causal control data to be written before the actual content information. Further, the scope of the invention is not limited to the embodiments, and the invention lies in each and every novel feature or combination of features described above. It is noted, that the invention may be implemented by means of hardware and/or software, and that in this document the word 'comprising' does not exclude the presence of other elements or steps than those listed and the word 'a' or 'an' preceding an element does not exclude the presence of a plurality of such elements, that any reference signs do not limit the scope of the claims, that 'means' may be represented by a single item or a plurality and that several 'means' may be represented by the same item of hardware.

What is claimed is:

1. A method comprising the steps of:

receiving real-time information;

subdividing the real-time information into cells;

generating control information related to the real-time information, the control information including playback parameters for reproducing sequences of the cells;

selecting a starting point within a recording area on a record carrier arranged according to a recording format, the starting point being after the beginning of the recording area for creating a free area between the beginning of the recording area and the starting point;

recording the real-time information after the starting point; and recording in the free area, the control information related to the real-time information;

and wherein at least a portion of the control information is recorded subsequent in time to recording related real-time information.

2. A method comprising the step of:

receiving real-time information;

subdividing the real-time information into cells;

generating control information including Playback parameters for reproducing sequences of the cells;

selecting a starting point within a recording area on a record carrier arranged according to a recording format, the starting point being after the beginning of the recording area for creating a free area between the beginning of the recording area and the starting point;

recording the real-time information after the starting point, and recording the control information in the free area;

and wherein, the recording format requires a variable area for the control information depending on variations of the playback parameters, and the free area is smaller than the variable area maximally required to accommodate all possible variations of the playback parameters.

3. A device comprising:

recording means arranged for subdividing real-time information into cells and for including playback parameters in the control information for reproducing sequences of cells;

means for selecting a starting point within a recording area after the beginning of the recording area for creating a free area between the beginning of the recording area and the starting point;

means for recording the real-time information after the starting point and for recording in the free area, the control information related to the real-time information;

and wherein at least a portion of the control information is recorded subsequent in time to related real-time information.

4. A device comprising:

recording means arranged for subdividing real-time information into cells and for including playback parameters in the control information for reproducing sequences of cells;

means for selecting a starting point within the recording area after the beginning of the recording area for creating a free area between the beginning of the recording area and the starting point; and means for recording the real-time information after the starting point and for recording in the free area, the control information;

and wherein:
the recording format requires a variable area for the control information depending on variations of the playback parameters; and the free area is smaller than the variable area required to accommodate all possible variations of the playback parameters.

5. The device of claim 4, wherein the allowed variations of at least one playback parameter or combination of playback parameters is restricted so that the variations of the playback parameters will fit within the smaller free area.

6. The device of claim 3, wherein the recording format is the DVD format.

7. The device of claim 6, wherein the free area is created to accommodate VMGI, VMGI$_{13}$ BUP, VTSI and VTSI$_{13}$ BUP and/or, while the recording area is intended for recording VOBS, the free area is created to accommodate a VOBS containing a menu constituting said playback parameters.

8. The method of claim 1, wherein the recording format is the DVD format.

9. The device of claim 3, wherein elements of the control information are recorded during recording the real-time information.

10. The device of claim 9, wherein the elements of the control information are recorded at their final location in the free area on the record carrier according to a recording format.

11. The method of claim 2 wherein at least a portion of the control information is recorded subsequent in time to recording related real-time information.

12. The apparatus of claim 4 wherein at least a portion of the control information is recorded subsequent in time to recording related real-time information.

13. A method comprising the steps of:

receiving real-time information;

subdividing the real-time information into cells;

generating control information related to the real-time information, the control information including playback parameters for reproducing sequences of the cells;

selecting a starting point within a recording area on a record carrier arranged according to a recording format, the starting point being after the beginning of the recording area for creating a free area between the beginning of the recording area and the starting point;

recording the real-time information cells after the starting point; and recording in the free area, the control information related to the real-time information;

and wherein at least a portion of the control information is generated as related real-time information is recorded.

14. A device comprising:

recording means arranged for subdividing real-time information into cells and for including playback parameters in the control information for reproducing sequences of cells;

means for selecting a starting point within a recording area after the beginning of the recording area for creating a free area between the beginning of the recording area and the starting point;

means for recording the real-time information after the starting point and for recording in the free area, the control information related to the real-time information;

and wherein at least a portion of the control information is generated as related real-time information is recorded.

* * * * *

UNITED STATES PATENT AND TRADEMARK OFFICE
CERTIFICATE OF CORRECTION

PATENT NO.    : 6,377,518 B1                                                          Page 1 of 1
DATED         : April 23, 2002
INVENTOR(S)   : Johannes C.L. Auwens and Robert A. Brondijk It is certified that error appears in the above-identified patent and that said Letters Patent is hereby corrected as shown below:

<u>Column 17,</u>
Line 22, change "$VMGI_{13}$ BUP" to -- VMGI_BUP --.

Signed and Sealed this

Nineteenth Day of November, 2002

*Attest:*

*Attesting Officer*

JAMES E. ROGAN
*Director of the United States Patent and Trademark Office*